(No Model.) 7 Sheets—Sheet 1.

W. ZOELLER.
MOLDING MACHINE.

No. 591,520. Patented Oct. 12, 1897.

Witnesses:
A. F. Durand
L. H. Stone

Inventor:
William Zoeller
by Page & Belfield
Attys (No Model.)

7 Sheets—Sheet 2.

W. ZOELLER.
MOLDING MACHINE.

No. 591,520.

Patented Oct. 12, 1897.

Witnesses:
A. F. Durand.
L. M. Stone.

Inventor:
William Zoeller
by Page & Belfield
attys (No Model.) 7 Sheets—Sheet 3.
W. ZOELLER.
MOLDING MACHINE.
No. 591,520. Patented Oct. 12, 1897.
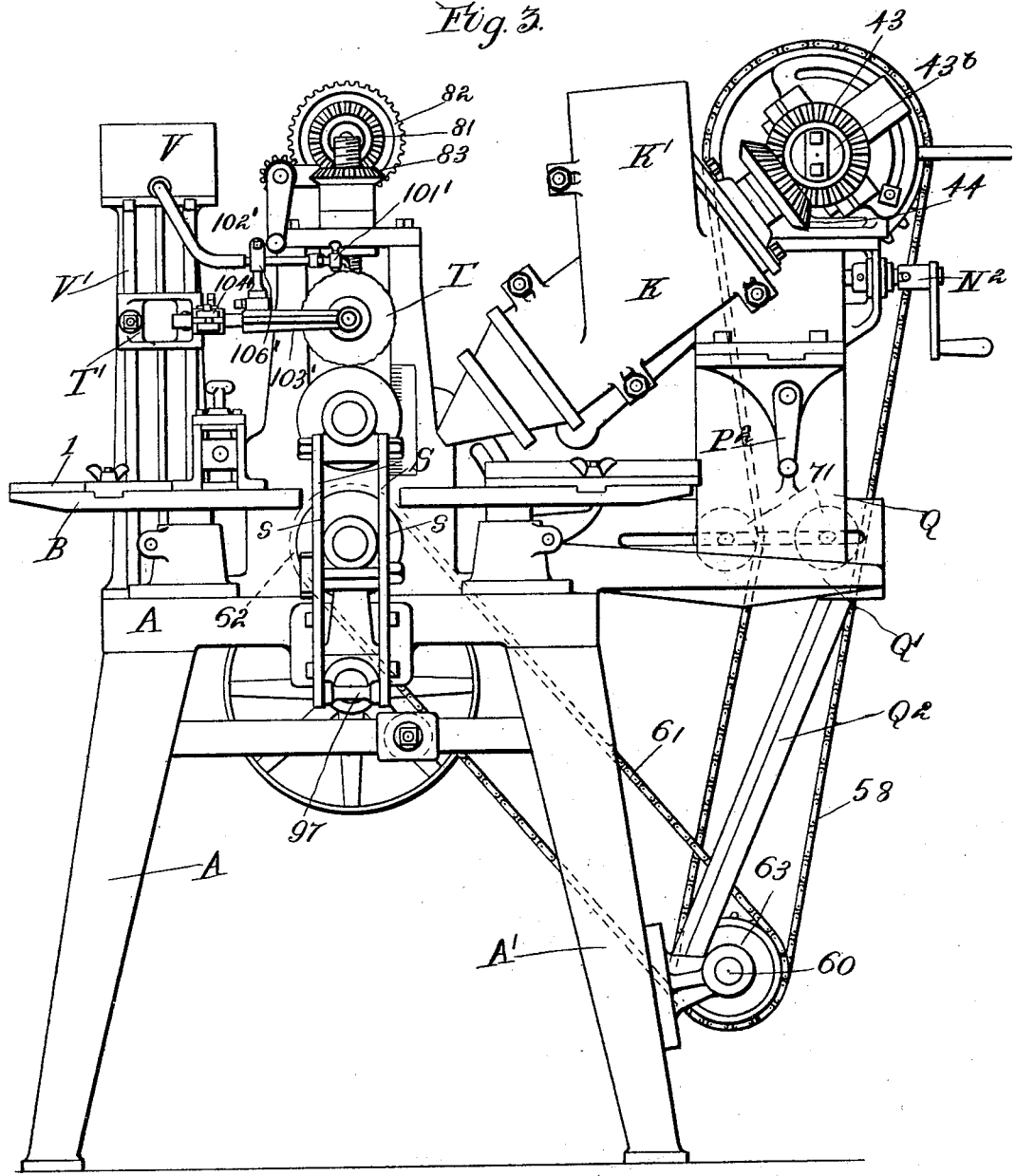
Witnesses:
A. F. Durand
L. M. Stone
Inventor:
William Zoeller
by Page & Belfield
attys.

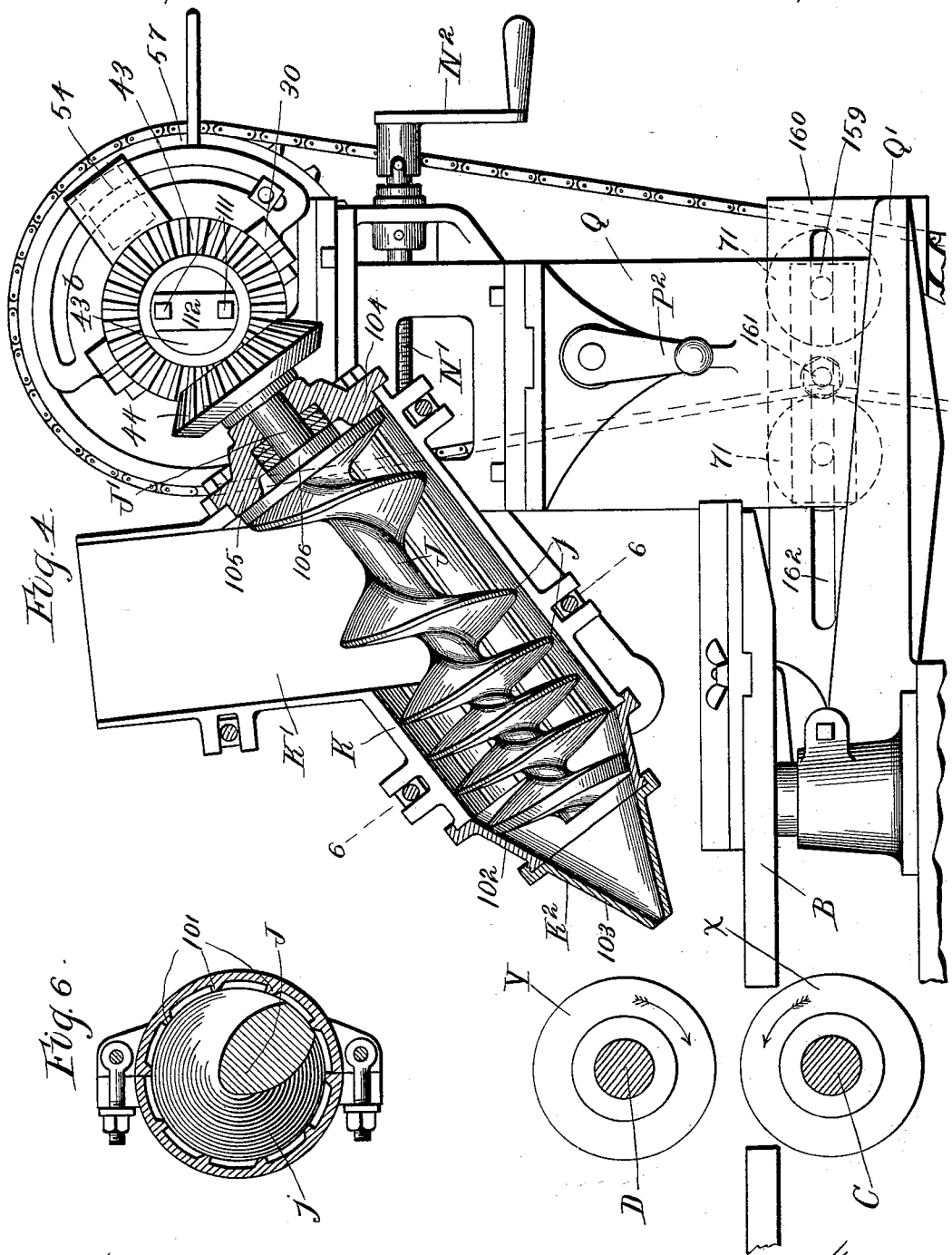

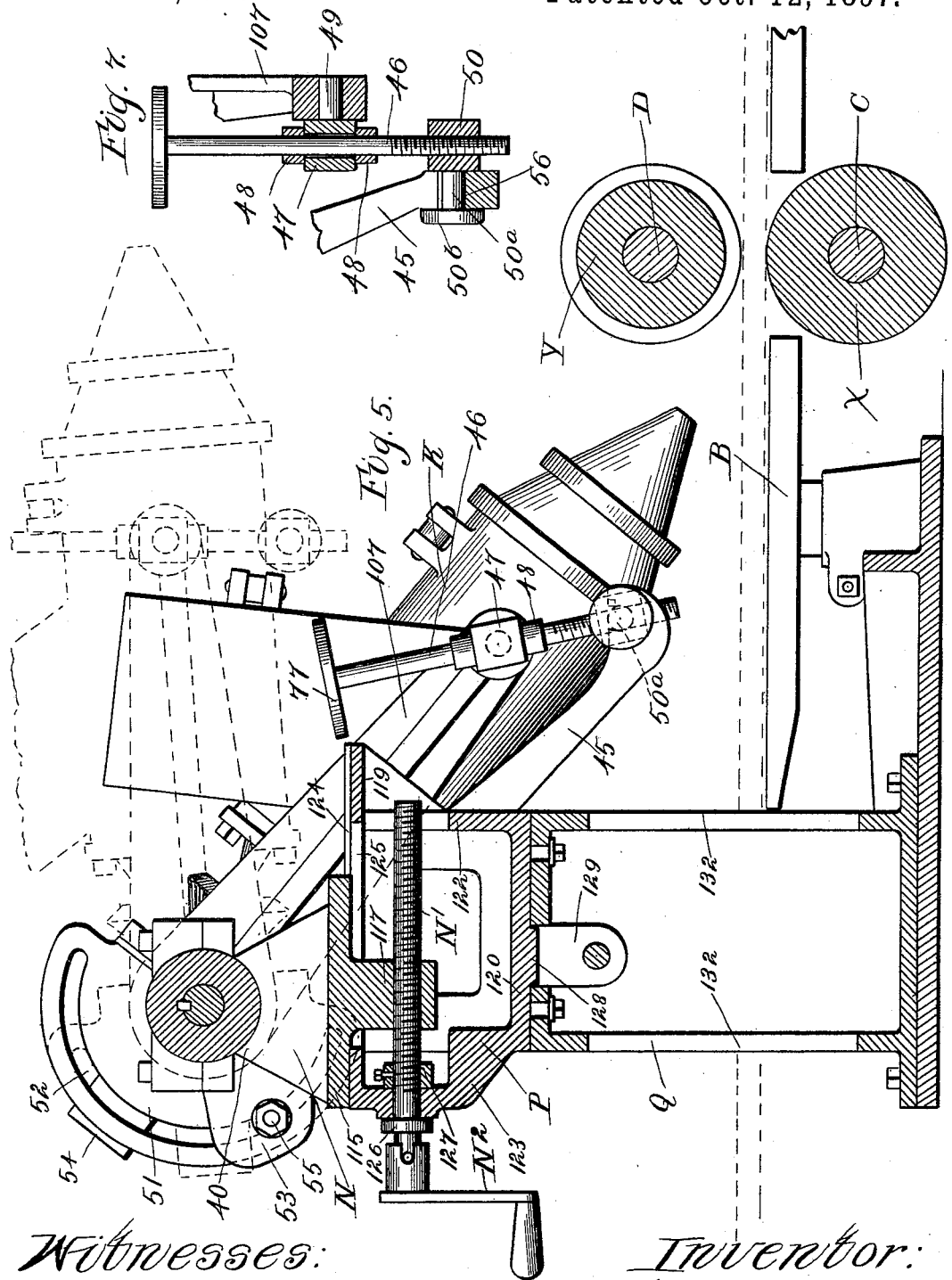

(No Model.) 7 Sheets—Sheet 6.
W. ZOELLER.
MOLDING MACHINE.
No. 591,520. Patented Oct. 12, 1897.
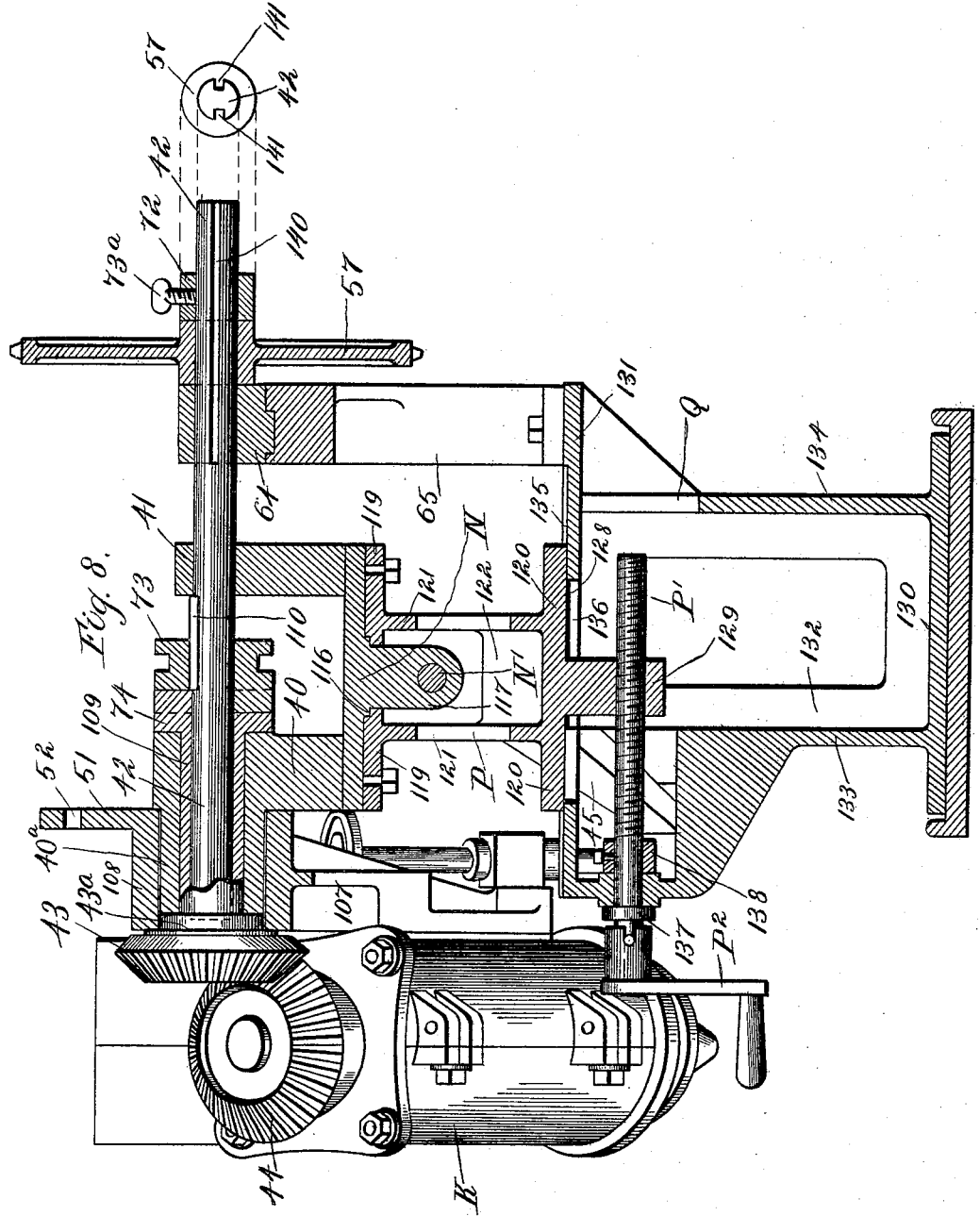
Witnesses:
A. F. Durand.
L. M. Stone.
Inventor:
William Zoeller
by Page & Belfield
Attys (No Model.) 7 Sheets—Sheet 7.
W. ZOELLER.
MOLDING MACHINE.
No. 591,520. Patented Oct. 12, 1897.
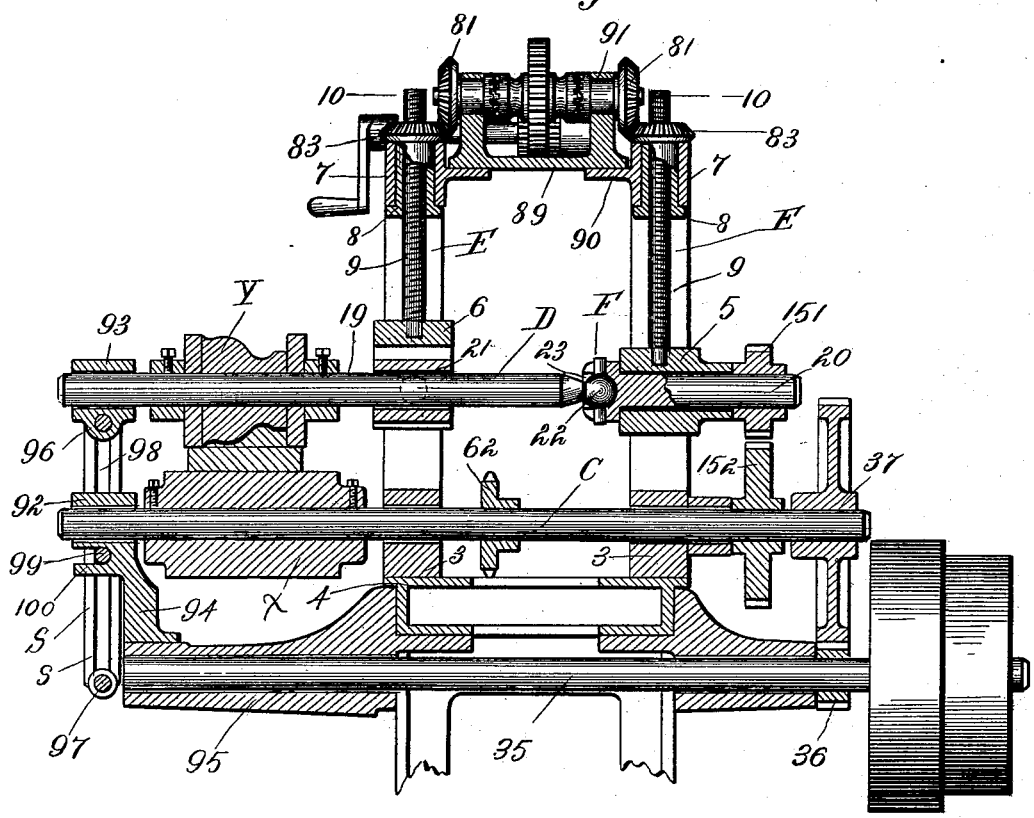
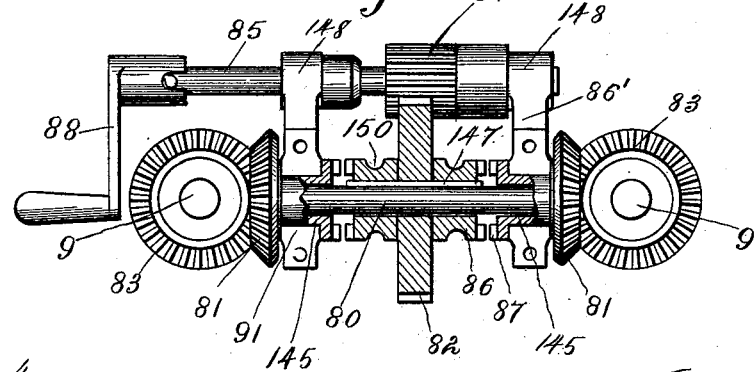
Witnesses:
A. F. Durand.
L. Th. Stone.
Inventor:
William Zoeller
by Page & Belfield
Attys.
THE NORRIS PETERS CO., PHOTO-LITHO., WASHINGTON, D. C.

United States Patent Office.

WILLIAM ZOELLER, OF CHICAGO, ILLINOIS.

MOLDING-MACHINE.

SPECIFICATION forming part of Letters Patent No. 591,520, dated October 12, 1897.

Application filed February 15, 1897. Serial No. 623,513. (No model.)

*To all whom it may concern:*

Be it known that I, WILLIAM ZOELLER, a citizen of the United States, residing at Chicago, in the county of Cook and State of Illinois, have invented a certain new and useful Improvement in Molding-Machines, of which the following is a specification.

My invention relates to machinery adapted for producing ornamental moldings and involving a pair of rotary dies or rolls between which a strip of molding faced with some suitable plastic material is fed and ornamented by the embossing action of one of the dies or rolls upon the plastic facing. In such machinery the plastic material for facing the molding-strip is usually placed thereupon at a point adjacent to and at the feed side of the dies or rolls, whereby the embossing-roll will both spread the material upon the strip and shape the same in accordance with the particular pattern by which the embossing-die is characterized.

The objects of my present invention are the provision of a simple and efficient device for automatically feeding the plastic material to the molding-strip and of an efficient, quick-acting, and easily-operated mechanism for adjusting said feed device so that the plastic material may be effectively applied to molding-strips of different sizes and shapes, the prevention of any undesirable collecting of the plastic material upon the embossing die or roll which comes in contact with the same, and the improvement of certain features of construction involved in a machine of this kind, for which I have secured Letters Patent of the United States No. 445,215, dated January 27, 1891.

To the attainment of the foregoing and other useful ends my invention consists of matters hereinafter set forth.

Figure 1:
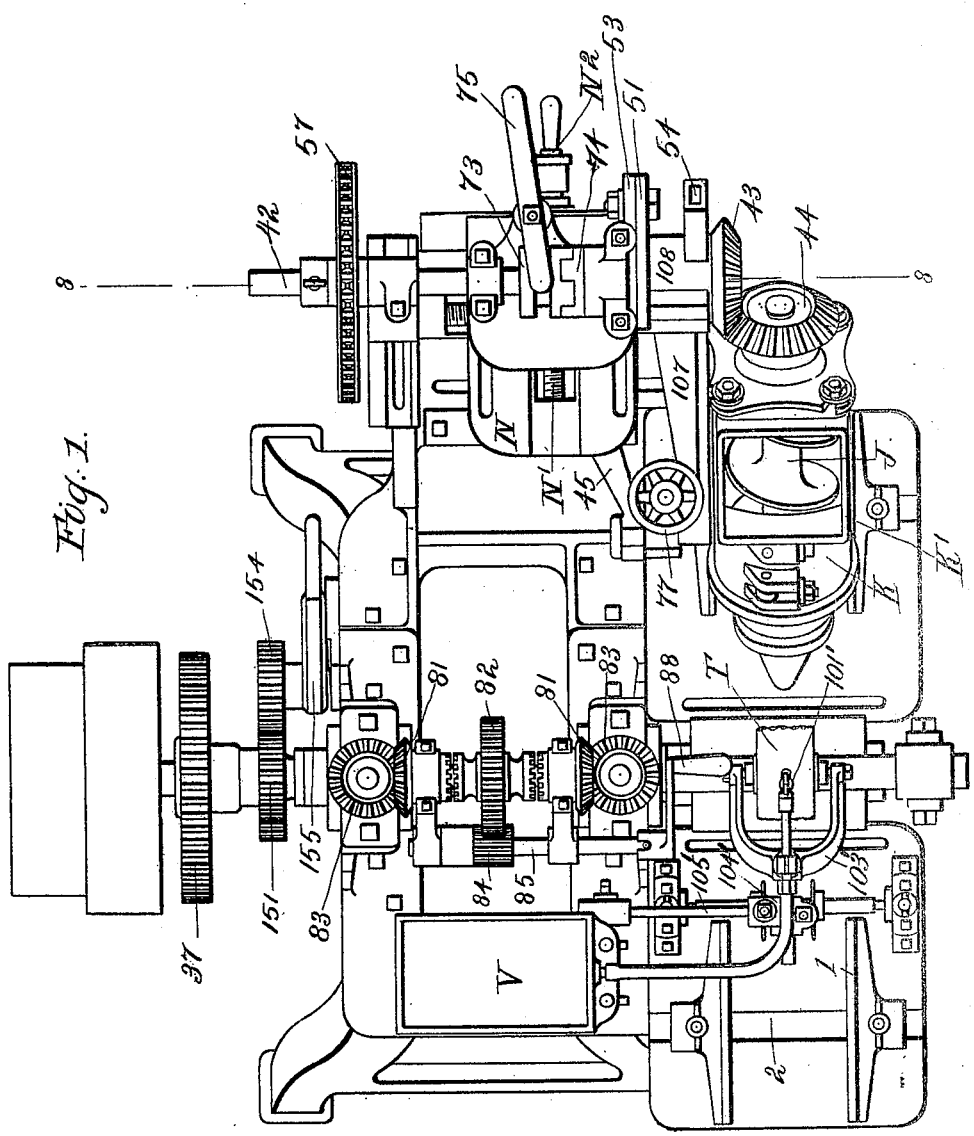
Figure 2:
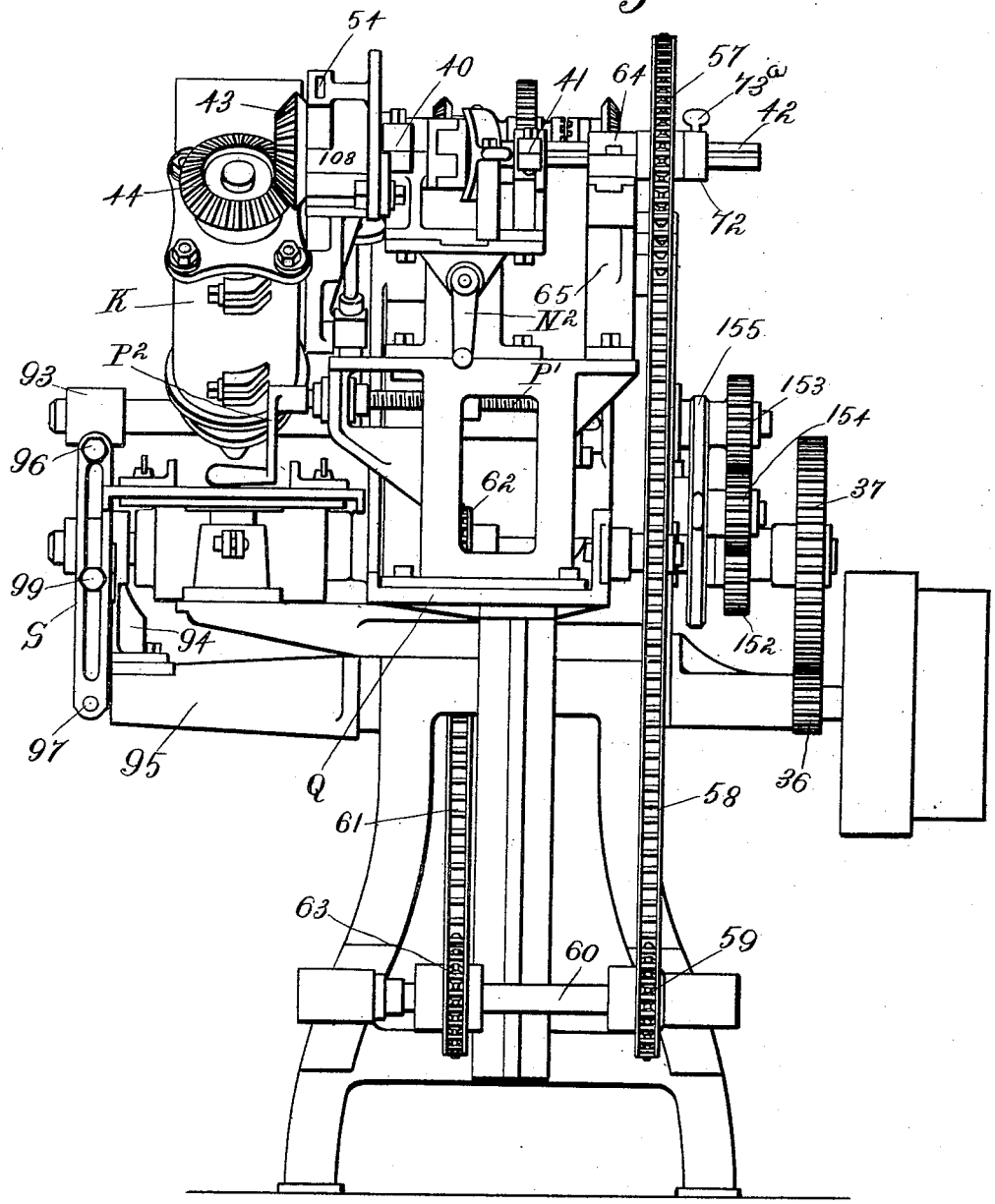

In the accompanying drawings, Figure 1 is a plan view of a machine embodying my invention. Fig. 2 is a front elevation of the same. Fig. 3 is an elevation of the left end or side of the same. Figs. 4 and 5 are views taken on a larger scale and from opposite sides of the machine, illustrating the feed device and operating mechanism therefor partly in elevation and partially in vertical section. Fig. 6 is a section taken on line 6 6 in Fig. 4. Fig. 7 is a view illustrating in detail certain portions of the construction shown in Fig. 5. Fig. 8 is a vertical section of a portion of the machine, taken on line 8 8 in Fig. 1, on a larger scale than that used in the latter figure. Fig. 9 is a vertical section taken on a plane coincident with the axes of the arbors which carry the rotary dies or rolls; and Fig. 10 is a horizontal section, taken on line 10 10 in Fig. 9, on a larger scale.

I have illustrated in the drawings a machine having the general construction of the machine of my said patent. As such machine is fully described in said patent I shall here refer to its general construction only briefly. This machine involves a main frame or top A, which is provided with suitable legs A', and also with bearings appropriate for the several operative parts of the machine, and a work-table B, which is supported upon the frame A in a position convenient for an attendant. This work-table B is adapted to support and guide the work to and from a pair of rotary molding-dies or embossing-rolls, and to such end may be provided with suitable guides 1, Fig. 1, arranged, respectively, at the feed and delivery sides of the embossing-rolls and constructed so as to be adjustable in slots 2 in said table for the accommodation of molding-strips of various widths.

In the figures I have illustrated a couple of embossing-rolls X and Y, carried, respectively, by a couple of rotary shafts or arbors C and D, (shown best in Fig. 9,) which latter are arranged one above the other, and are adapted to receive such dies or rolls as it may be desired to employ for feeding and embossing the work.

The lower arbor C consists of a straight cylindric shaft, and is mounted in bearings 3, which are fixed to the main frame of the machine.

The upper arbor D comprises a couple of sections 19 and 20, whereof the section 19 is preferably somewhat longer than the section 20. The arbor-sections 19 and 20 of the arbor D are joined together by a ball-and-socket joint, the connection shown consisting of a rounded or spherical end 22 on arbor-section 19, and a concave seat or socket 23, formed in the adjoining end of arbor-section 20. Power is transmitted from one to the other of these sections 19 and 20 by means of a pin F, which extends through the rounded end 22 of the arbor-section 19 and works in slots formed in opposite sides of the concave seat or bearing 23 of section 20.

The arbor-section 19 is mounted in a bearing 21, which is trunnioned or pivotally connected with a box 6, and the arbor-section 20 is mounted in a bearing or box 5. The boxes 6 and 5 are vertically adjustable in standards or housings E, which rise from the upper portion 4 of the main frame, by which arrangement the embossing-roll Y can be adjusted to any vertical height, and also to any inclination with the horizontal for embossing molding-strips of different sizes and shapes. As a matter of further and specific improvement over my said patent in the arrangement for vertically adjusting the boxes 5 and 6 screw-rods 9 are arranged vertically within said housings E and are securely attached at their lower ends to the boxes 5 and 6. Said screw-rods 9 fit within threaded sockets formed in rotary nuts 8, which latter are arranged within suitable bearings 7, formed at the upper ends of the housings E, and are provided at their upper ends with bevel gear-wheels 83, Fig. 10. The bevel gear-wheels 81 are formed, respectively, upon the outer ends of sleeves 145, which latter are provided at their inner ends with clutch members 87. The clutch members 87 are adapted to engage, respectively, with corresponding clutch members 86, arranged for independent sliding movement upon a rotary shaft 80, which latter is, to such end, provided with a feather 147, adapted to allow a sliding movement on the part of said clutch members 86 and at the same time to cause the same to rotate with the shaft 80.

The shaft 80 is supported by the sleeves 145 and works within the hollow bores of the same. Said shaft 80 is provided with a rigidly-attached spur-wheel 82, which meshes with a gear-wheel 84, mounted on a shaft 85, having a handle 88. The bearings 91 for the rotary sleeves 145 are conveniently supported upon seats 90, formed near the upper ends of the housings E, and the bearings 148 for the rotary shaft 85 are conveniently provided by arms 86', which project horizontally from a table 89, from which the bearings 91 rise. By such arrangement either of the sections of the arbor D can be raised or lowered independently by throwing one or the other of the clutch members 86 into engagement with its coöperating clutch member 87 and turning the handle 88, and also both of said arbor-sections can be simultaneously raised or lowered by throwing both of the clutch members 86 into engagement with the members 87 and turning said handle 88. This arrangement permits a great variety of adjustments and at the same time is simple and easily operated. As an example of its operation, suppose an embossing-roll is to be used at a predetermined angle for making molding-strips. To secure such angle, I elevate the arbor D until it reaches its uppermost position or any other determined position and then lower the section 19 until the required angle is formed thereby, for the determination of which angle I may arrange a suitably-graduated scale upon the left-hand housing E, Fig. 9. The proper inclination or angle of the embossing-roll having thus been secured I throw both clutch members 86 into engagement with the members 87 and adjust the arbor D as an entirety until the embossing-roll attains the desired vertical position.

The clutch members 86 could obviously be provided with suitable hand-levers or the like for throwing them into engagement with the members 87; but I prefer to move the same by hand, and to such end provide them with annular grooves 150, adapted to accommodate the fingers.

As a convenient arrangement for driving the arbors C and D the former is connected with the pulley-shaft 35 by means of gear-wheels 36 and 37, and the latter is connected with the arbor C by any suitable "expansion-gearing" adapted to preserve its integrity as a power-transmitting connection regardless of the relative vertical adjustment of the arbors. The form of expansion-gearing shown consists of an adjustable bearing-plate 155, which carries a couple of intermeshing gears 153 and 154, one of which engages a gear 151 on the arbor D, while the other engages a gear 152 on the arbor C.

As a matter of still further improvement over my said patent I have shown the outer ends of the arbors C and D supported by suitable bearings 92 and 93, respectively, the ends of said arbors being extended to provide suitable journals for the same. The bearing 92 is formed at the upper end of a short standard 94, which latter is bolted to an extended bearing 95 for the pulley-shaft 35. The bearing 93 is pivotally connected at its lower end with a swinging link S by means of a pivotal bolt 96. The swinging link S is conveniently composed of a couple of side rods s, which are connected at their upper ends by the bolt 96 and at their lower ends by a similar bolt 97. The side rods s are provided with longitudinal guideways or slots 98, adapted to receive a pivotal bolt 99, which extends through the same and is supported upon a seat 107, formed in the standard 94 below the bearing 92. By such arrangement the arbors C and D are supported on both sides of the embossing-rolls, whereby the latter are caused to rotate evenly and at a fixed distance apart. The bearing for the lower arbor can be easily removed, so as to permit the removal of the lower roll, by unbolting the standard 94 and removing the same, and the bearing for the upper arbor can adapt itself to the various inclinations assumed by the outer section of said arbor by swinging about its pivotal connection with the swinging link S and can also be swung bodily inward and outward and be elevated and depressed in accordance with the movement of said arbor-section by reason of the pivotal and sliding connection which said swinging link has with the frame of the machine.

When it is desired to bring the upper and lower arbors nearer together than will be permitted by the enlarged portion of the bearing 93, through which the bolt 96 extends, when said enlarged portion is below the arbor, as shown in Fig. 9, said bearing 93 can first be slid off the end of said arbor, then be turned one-half of a revolution about its pivot 96, and finally be placed over the arbor again, or the link S can first be swung outward until the bolt 99 is disengaged from its seat 100, then be revolved one-half a revolution about the axis of the upper arbor, and finally be swung downward about the bolt 96 as a center until the bolt 99 again engages its seat 100. Either of said operations will result in bringing the enlarged portion of the bearing 93 above the upper arbor, and thereby allowing the latter to be brought into close proximity with the lower arbor.

Prominent features of my present invention are a device for automatically feeding plastic material to the molding-strip before the passage of the same between the embossing dies or rolls and mechanism for adjusting said feed device. Although I have shown such feed device employed in connection with the molding-machine herein described, it will be understood that it is applicable as well to differently constructed machines of this class.

My said feed device comprises a feed-hopper K for the plastic material and a rotary feed screw or conveyer J, inclosed within said hopper and arranged to force the plastic material therefrom. The hopper K is desirably cylindrical in form and is conveniently cast in two longitudinal halves, which are bolted together, as shown in Figs. 4 and 6. The interior walls of the hopper are provided with inwardly-projecting longitudinal ribs 101, which prevent a tendency on the part of the plastic material to rotate with the feed-screw, it being observed that such rotary motion is objectionable as tending to prevent a proper feeding action of the plastic material and also for the reason that such material is not deposited properly upon the molding-strips if it is rotating when forced out of the hopper.

The end piece 104 of the hopper K is removable and is conveniently bolted to the end of the hopper, by which arrangement the feed screw or conveyer J can be removed bodily from the hopper after a preliminary removal of the end piece 104, it being observed that such removal of the feed screw or conveyer is not only a desideratum but is a practical necessity, for the reason that the plastic material will become hard and set if left in the hopper for any length of time—as, for instance, overnight.

The feed-hopper K has a side feed-opening near its rear end, which opening is conveniently provided by a laterally-projecting tubular or cylindric extension K'. The extension K' is desirably constructed integral with the hopper K, being conveniently cast in longitudinal halves respectively with the halves of which the hopper is constructed and then bolted together. The hopper K is also provided with a tapering spout or nozzle K², which is attached to its forward end. The nozzle K² consists of the rear portion 102 and the forward pointed portion 103. The rear portion 102 is attached securely to the forward end of the feed-hopper and is externally threaded at its forward end. The forward pointed portion 103 has an outlet-opening at its forward end and is internally threaded at its rear end, so that it can be screwed upon the rear portion 102. By such arrangement the plastic material can be properly directed in a steady stream through the nozzle-opening, and also the size of the nozzle-opening can easily be changed by removing the forward portion of the nozzle and substituting a similar forward portion having a different-sized opening, it being observed that different styles of molding-strips require a greater or less amount of plastic material, and hence it is necessary to change the size of the outlet-opening in accordance with the amount of plastic material required.

The rotary feed screw or conveyer J, which is arranged and fits closely within said feed-hopper K longitudinally of its cylindrical bore, is constructed with threads $j$, whereof the rear threads have a greater pitch—that is to say, are situated farther apart than the forward threads. By such arrangement the plastic material when it is fed into the hopper through the side feed-opening does not cling to the outer edges of the threads, but passes freely into the hopper between the comparatively coarse or widely-separated threads of the feed-screw. By such arrangement, also, the plastic material is closely packed between the comparatively fine threads at the forward end of the screw and is forced through the nozzle-opening in a dense and compact stream.

The forward threads of the feed-screw J are tapered sufficiently to allow such threads to extend into the tapering nozzle K² as far as the line of connection of portions 102 and 103 of said nozzle, whereby said threads form a forward bearing portion for the screw and prevent a forward thrust on the part of the same.

The rear end of the feed-screw J is constructed with a short stem or shaft J', which extends therefrom and rotates within a suitable opening provided for such purpose in the hopper end piece 104. In order to prevent any undesirable leakage through the opening in which said stem J' works, the latter is provided with suitable packing-washers 105, which fit within a socket formed in the interior wall of said end piece and against a disk or hub 106, with which the stem J' is provided.

The feed-hopper K is supported above the feed-table B and to the feed side of the embossing-rolls, as shown in Fig. 4. Said hopper is mounted for swinging motion about a pivotal point, so that its nozzle can be raised or lowered, it being observed that the thickness of molding-strips varies considerably, and that in order to obtain the best results the nozzle of the feed-hopper when delivering the plastic material to the molding-strips should be situated as close to the latter as possible.

As a simple arrangement for pivotally supporting the feed-hopper K and for providing at the same time a convenient and satisfactory power-transmitting connection for the feed-screw J said feed-hopper is provided with a rigidly-connected and longitudinally-extending side arm 107, Fig. 8, adapted for supporting the hopper, and provided at its rear end with an enlarged portion or head 108. The head 108 is provided with a cylindrical bore adapted to receive a cylindrical sleeve 40$^a$, which incloses a rotary sleeve 109, which latter is fitted loosely upon a rotary shaft 42, the position of the cylindric bore of said head 108 being such as to bring the rear end of the feed-hopper a little below the axis of said shaft. The sleeve 109 is supported upon a suitable bearing 40, of which the sleeve 40$^a$ is a lateral extension, and is provided at one end with a clutch member 74 and at the other end with a bevel gear-wheel 43. The clutch member 74 is adapted to engage a corresponding clutch member 73, which is arranged to slide upon the shaft 42 and to be turned by means of a feather 110 upon said shaft. The bevel-wheel 43 is adapted to mesh with a similar bevel gear-wheel 44, with which the rear projecting end of the feed-screw stem J' is provided. By such arrangement the sleeve 40$^a$ serves both as a support and as a pivotal connection for feed-hopper, whereby the same can be swung in such a manner as to elevate and depress its nozzle in accordance with the thickness of different-sized molding-strips and at the same time provides a long bearing for the rotary sleeve 109, which in turn provides a long bearing for the rotary shaft 42. By such arrangement, also, the rotary shaft 42 and the rotary sleeve 109 provide a satisfactory power-transmitting connection, whereby the feed screw or conveyer can be rotated irrespective of the position to which said hopper is adjusted and can also be rotated continuously while such adjustments are being made. A suitable lever 75 is provided for throwing the clutch member 73 into engagement with the clutch member 74, whereby the feed-screw can be started and stopped at will. It will be observed that owing to the inclination of the meeting faces of the bevel gear-wheels 43 and 44 neither one can be moved axially, so as to remove it from the rotary member to which it is secured. Hence it is necessary to attach one of said gear-wheels, so that it can be moved laterally to its axis of rotation. In the arrangement shown the wheel 43 is constructed with a flat rear or inner face 43$^a$, and the sleeve 109 is provided at its outer end with a corresponding flat face, whereby the wheel and sleeve may be fitted closely together by a lateral movement, it being observed that to such end shaft 42 does not extend to the end of the sleeve 109, but terminates within the same, as shown in dotted lines in Fig. 8.

As a means of securing the gear-wheel and sleeve together a couple of threaded bolts 111 are arranged to extend through apertures in said gear-wheel and into correspondingly-threaded sockets in the sleeve 109, so as to draw a flat plate 112 against the outer central face 43$^b$ of said wheel. The presence of two bolts 111 serves to insure the attachment of the gear-wheel 43 in such a manner that its center shall coincide with the axis of the shaft 42. By such arrangement when it is desired to remove the gear-wheel 43 in order to permit the withdrawal of the feed-screw from the feed-hopper, or for any other reason, the said gear-wheel can be detached by simply unscrewing the bolts 111 and moving the wheel 43 away from the corresponding wheel 44 on the feed-screw.

As an arrangement for effecting the swinging or pivotal adjustments of the feed-hopper K a screw-rod 46, having an adjusting hand-wheel 77, is connected with the lower end of the arm 107 and also with a suitably-supported depending arm 45. The screw-rod 46 works in a bearing or box 47 and is provided with collars 48, which are rigidly secured to it at opposite sides of said bearing or box, so as to prevent end play in the same. The bearing or box 47 is provided with a stud or pin 49, which fits adjustably in a corresponding socket formed in the lower end of the arm 107, as best shown in Fig. 7. The lower threaded end of the adjusting-screw 46 works in a corresponding threaded socket 50, which latter is provided with a stud or pin 50$^a$, adapted to fit in a concave seat formed in the lower end of the arm 45. The end of the stud 50$^a$, opposite the socket 50, is provided with a flange 50$^b$, which serves to prevent the stud 50$^a$ from sliding longitudinally upon its seat in the arm 45. By such arrangement the nozzle of the feed-hopper can be elevated or depressed by adjusting the screw-rod 46, and during such adjustments said adjusting screw-rod can swing about its swivel connections with its support and with the arm of the feed-hopper, so as to accommodate itself to the various inclinations which it must make when so adjusted. By such arrangement also the feed-hopper can be swung upward, so as to lift the stud 50$^a$ of the threaded socket 50 from its seat in the arm 45, it being observed that it is very desirable to bring the nozzle of the hopper above its rear end, as shown in dotted lines in Fig. 5, in order to facilitate cleaning the interior of the hopper. Also, when the hopper is swung upward, so as to lift the threaded socket from its seat, the adjusting screw-rod and attachments can be bodily removed by withdrawing the stud or pin 49 of the box 47 from its socket in the arm 107.

As an arrangement for locking the feed-hopper in its elevated positions I have shown the head 108 of the arm 107 provided with a flange 51, having a circular slot or guideway 52, and have shown also the bearing 40 provided with a laterally-projecting ear or lug 53, which is arranged to face the flange 51 and is provided with a bolt 55, adapted to extend through the slot or guideway 52. The feed-hopper can therefore, when unsupported by the adjusting screw-rod, be locked in any elevated position by tightening the nuts with which the bolt 55 is provided.

Owing to the weight which the feed-hopper and feed screw or conveyer possess when constructed of metal and the difficulty of elevating the same directly by hand I have shown said hopper provided with a socket 54, which extends upward from the head 108 of the arm 107, and is adapted to receive the end of a long rod or bar, whereby the hopper can be swung upward by inserting one end of a long rod or bar within said socket and bearing down upon the other end. The construction and arrangement of feed device thus described is simple, efficient, and easily constructed. By it the plastic material can be applied in large or small quantities and at any desired vertical point. Its parts are readily accessible and can be easily repaired or replaced. It can be easily taken apart and cleaned, and to facilitate such cleaning the feed-hopper can be swung upward, so that its nozzle is above its rear end.

The feed-hopper K is also supported so that it can be adjusted laterally to and longitudinally of the path of travel of the molding-strip, it being observed that such adjustments are desirable, for the reason that the plastic material is to be applied upon different styles of molding-strips in longitudinal lines situated at various distances from the edges thereof and also at points situated at a greater or less distance from the embossing-roll. To such end I have shown the bearing 40 for the sleeve 109 and the bearing 41 for the shaft 42 mounted upon a sliding carriage N and the latter supported for sliding movement upon a second sliding carriage P. The carriage N slides upon the carriage P in a direction parallel to the path of travel of the molding-strip, and the carriage P slides laterally to such path of travel upon a suitable pillar or support Q.

The carriage N consists of a horizontal flat portion 115, which is constructed with a longitudinal tongue 116, and also with a lug or projection 117, depending from the middle of the tongue 116. The lug 117 is provided with a threaded socket which engages a longitudinally-arranged screw-rod N', having a handle N², whereby the carriage N can be adjusted by turning said screw-rod.

The carriage P consists of the upper and lower horizontal flat portions 119 and 120, a couple of vertical side walls 121, and the forward and rear walls 122 and 123, connecting said flat portions 119 and 120. The upper flat portion 119 is adapted to form a seat for the carriage N and is constructed with a longitudinal channel 124, which is adapted to serve as a guideway for the tongue 116 of the carriage N, and also with a longitudinal slot 125, in which the depending lug 117 of said carriage N can work.

The rear wall 123 of the carriage P is bent outwardly and is provided with an aperture adapted to receive the screw-rod N', by which the carriage N is adjusted. Thus the rear wall 123 of said carriage P serves both as a support and a guide for said screw-rod N', which latter is constructed with an enlarged portion 126 near the handle N², and is provided with an adjustable nut 127, situated on the inner side of the wall 123 as an arrangement for holding it against end play.

The forward wall 122 of the carriage P serves as a support for the arm 45, which supports the adjusting screw-rod 46, said wall 122 and arm 45 being conveniently cast integral with one another. Said arm 45 extends downwardly from the carriage P, as shown in Figs. 5 and 8, and also extends outwardly therefrom toward the feed-hopper, as shown in Fig. 8.

The lower flat portion 120 of the carriage P is constructed with a transverse tongue 128 and a depending lug 129, similar to the tongue and lug of the carriage N. The lug 129 is provided with a threaded socket adapted to receive a laterally-arranged screw-rod P', having a handle P², whereby said carriage P can be shifted laterally by a rotation of the screw-rod P', irrespective of the position of the carriage N upon it.

The pillar Q, upon which the carriage P is arranged, consists of a horizontal base-plate 130, a horizontal top 131, vertical front and rear walls 132, and vertical side walls 133 and 134, connecting said base-plate 130 and top 131. The top 131 is constructed with a transverse channel or groove 135, adapted to serve as a guideway for the tongue 128 on the carriage P, and with a slot 136, in which the lug 129 of said carriage can work. The side wall 133 of the pillar Q is provided with an aperture adapted to receive the screw-rod P', by which said carriage P is adjusted, the said screw-rod being held against end play therein by an enlarged portion 137 and an adjusting-nut 138, with which it is provided on opposite sides of said wall 133. By such arrangement the feed-hopper can be moved parallel with or laterally to the path of travel of the molding-strip by turning the handles N' and P', respectively. The adjustments can be easily and quickly made, and each one can be made independent of the other. Hence by mounting the feed-hopper as herein set forth the nozzle of said hopper can be adjusted vertically, so as to apply the plastic material upon molding-strips of different thicknesses. It can be adjusted laterally to the line of travel of such strips, so as to apply such material nearer to one side or the other of the same, and it can be adjusted longitudinally to said line of travel, so as to apply the material to the molding-strips at points more or less nearer the embossing-roll, and also so as to compensate for the slight backward and forward movement on the part of the nozzle when the same is adjusted vertically.

The pillar Q, which serves as a support for the sliding carriages N and P, is conveniently supported upon an arm Q', which is rigidly secured to the frame of the machine and which is braced by a leg Q². This provides a simple arrangement whereby I can attach the feed device and its adjusting mechanism to machines of this nature heretofore constructed by me, but not provided with automatic feed devices.

The rotary shaft 42 can be driven by any suitable power-transmitting connection. I have shown said shaft driven by a countershaft 60 through the medium of a sprocket-chain 58 and sprocket-wheels 57 and 59, mounted, respectively, on the shafts 42 and 60. The shaft 60 is in turn driven by the arbor C through the medium of a sprocket-chain 61 and sprocket-wheels 62 and 63, mounted, respectively, on the arbor C and the shaft 60. The shaft 60 is conveniently mounted upon the rear legs A' of the machine.

The sprocket-wheel 57 is mounted removably upon the shaft 42, whereby it can be removed and a sprocket-wheel of different size substituted, so as to drive the feed-screw J at a greater or less speed, according to the size of the opening of the nozzle with which the feed-hopper is at each particular time provided.

As a desirable additional support for the shaft 42 near the sprocket 57 I provide a bearing 64, supported upon a pillow-block 65, which is secured to the pillar Q. In order to make accommodation for the lateral movement on the part of said shaft, said bearing 64 is arranged for sliding movement upon the pillow-block 65. To such end the meeting faces of the bearing and pillow-block are tongued and grooved, as shown in Fig. 8. The bearing 64 is situated so that when the sprocket-wheel 57 abuts against its outer face said sprocket-wheel is in alinement with the sprocket-wheel 59 on the shaft 60. The sprocket-wheel 57 should therefore be capable of easy sliding adjustment upon said shaft 42, so that when the latter is moved longitudinally by a lateral movement of the carriage P said sprocket-wheel can be always kept flush with the bearing 64. As a simple construction for this purpose and for giving the sprocket-wheel a tight grip upon the shaft for rotary motion at the same time I provide said shaft 42 with a couple of oppositely-arranged longitudinal grooves 140 and the central bore of said sprocket-wheel 57 with a couple of splines 141, adapted to fit the channels 140. A collar 72, having a thumb-screw 73ª, is also arranged upon the shaft 42 outside the sprocket-wheel 57. This construction is best illustrated in Fig. 8 and in the small projection to the right of this figure. For convenience of illustration, however, the collar 72 is omitted from the small projection and only the hub of the wheel 57 is shown, which hub is indicated by the numeral 57. By such arrangement the sprocket-wheel 57 can be easily slid along the shaft 42, in accordance with the adjustments on the part of the carriage P, and can be held flush with the outer face of the bearing 64 by a suitable adjustment of the collar 72.

As a means of taking up the slack of the sprocket-chain 58 when the shaft 42 is moved laterally by the carriage N a couple of idle-sprockets 71, Fig. 4, are interposed between the sprockets 57 and 59 and are arranged for movement laterally to the direction of travel of said chain 58. Said sprocket-wheels 71 are conveniently carried by a plate 159, (shown in dotted lines,) which slides horizontally in contact with a vertical flange 160, with which the supporting-arm Q' is provided and which is locked in adjustment against said flange by means of an adjusting-bolt 161, adapted to work in a guideway or slot 162, formed in said flange.

I have shown as a matter of still further improvement in machines of this class an arrangement for preventing the accumulation of plastic material upon the upper embossing-roll, it being observed that such an accumulation of plastic material renders the impression of the embossing-die indistinct and imperfect. In such arrangement a rotary sponge T, Figs. 1 and 3, is supported above and in contact with the upper embossing-die and is continually moistened by water which issues from a faucet 101'.

The sponge T is conveniently supported by a forked arm 103' and the faucet 101' by a bracket 106', secured to the arm 103'. As a means of adjusting said sponge and faucet in accordance with the vertical and longitudinal adjustments on the part of the upper embossing-die the arm 103' is arranged for sliding movement along a horizontal guide-rod 105', and the latter is attached to a slide T', which is arranged for sliding movement upon guides provided by vertical standards or uprights V'. A tank or reservoir V is supported by the standards V' and is connected with the faucet 101' by a flexible connector 102'.

What I claim is—

1. The combination of a feed-hopper having a feed-outlet; a rotary feed device confined within the feed-hopper and arranged to feed the material out of the outlet of the latter; and a transverse rotary axle or shaft about which the hopper is arranged to swing, and with which its feed device has a power-transmitting connection, as set forth.

2. In a machine for making picture-moldings, a swinging feed-hopper having a feed-outlet and arranged for swinging motion in a manner to permit of its outlet being moved in a direction longitudinally of the path of travel of the molding-strip, as set forth.

3. In a machine for making picture-moldings, the combination of a feed-hopper having a feed-outlet and supported so as to permit the adjustment of said outlet; a feed device confined within the feed-hopper and arranged to feed the material out of its outlet; and means for operating the feed device independent of the position in adjustment of the feed-hopper.

4. In a machine for making picture-moldings, the combination of a swinging feed-hopper having a feed-outlet; a feed device confined within the feed-hopper and arranged to feed the material out of its feed-outlet; and means for operating the feed device independent of the position in swinging adjustment of the feed-hopper, as set forth.

5. In a machine for making picture-moldings, the combination of a feed-hopper having a feed-outlet; a feed device confined within the feed-hopper and arranged to feed the material out of its feed-outlet; a couple of sliding carriages supporting the feed-hopper and arranged for sliding adjustment in directions laterally to one another; and means for operating the feed device of the feed-hopper independent of the position in adjustment of said sliding carriages, as set forth.

6. In a machine for making picture-moldings, the combination of a swinging feed-hopper having a feed-outlet; a feed device confined within the feed-hopper and arranged to feed the material out of its feed-outlet; a couple of sliding carriages supporting the feed-hopper and arranged for sliding movement in directions laterally to one another; and means for operating the feed device of the feed-hopper independent of the position of the latter in swinging adjustment, or of the position of either of said carriages in sliding adjustment as set forth.

7. In a molding-machine, the combination of a feed-hopper having a feed-outlet; a sleeve to which the feed-hopper is pivotally connected; a rotary feed device confined within the feed-hopper and arranged to feed the material out of its feed-outlet; and a rotary member arranged within said sleeve and connected with the feed device so as to rotate the same, as set forth.

8. In a molding-machine, the combination with the feed-hopper inclosing a rotary feed screw or conveyer; the lower supporting-carriage arranged for sliding movement relatively to the frame of the machine, and in a direction laterally to the path of travel of the molding-strip; the upper supporting-carriage mounted upon the lower one, and arranged for sliding movement relatively thereto in a direction parallel with the said path of travel of the molding-strip; a rotary shaft mounted upon the upper carriage; and a rotary sleeve fitted over said shaft, which sleeve is gear-connected with the feed-screw, and is provided with a clutch member adapted to engage a coöperating clutch member with which said shaft is provided substantially as described.

9. In a molding-machine, the swinging feed-hopper, provided with adjusting means having swiveled connections with the feed-hopper, and with the support for said hopper, as set forth.

10. In a molding-machine, the combination with the feed-hopper, of the upper sliding carriage to which said hopper is pivotally connected; the lower sliding carriage upon which the upper carriage is mounted and arranged for sliding movement; an adjusting screw-rod which has a swiveled connection with the feed-hopper, and works in a threaded socket which is pivotally supported upon a concave seat formed in the lower end of an arm with which said lower carriage is provided, substantially as described.

11. In a molding-machine, the combination with the feed-hopper provided with a socket 54, and also with a circularly-slotted flange 51; of a support to which said feed-hopper is pivotally connected, said support being provided with an ear 53 arranged opposite the flange 51 and also with an adjusting-bolt 55 arranged to extend through the circular slot of the flange 51, substantially as described.

12. In a molding-machine, the combination with the rotary feed device provided with a bevel gear-wheel, of a rotary member arranged transversely to the axis of rotation of the feed device and provided with a similar gear-wheel meshing with the gear-wheel of the feed device for driving the latter, one of said gear-wheels having with the member to which it is attached, a connection adapted to permit of its removal therefrom in a lateral direction, whereby the feed device can be removed from the feed-hopper without necessitating a preliminary detachment either of the latter or of the rotary driving member, as set forth.

13. In a molding-machine, the combination with the rotary feed device, of a sliding carriage supporting the same; a rotary driving-shaft arranged for connection with the feed device and supported upon said carriage with its axis arranged transversely to the direction of motion thereof; a counter-shaft connected with said driving-shaft through the medium of a sprocket-chain and sprocket-wheels mounted upon the shafts; and idle-wheels situated between said shafts and arranged for movement laterally to the direction of travel of the chain, so as to take up the slack of the latter, as set forth.

14. In a molding-machine, the combination with the feed device, of a sliding carriage by which the same is supported; a rotary driving-shaft arranged for connection with the feed device and supported upon said carriage with its axis arranged parallel with the direction of motion thereof; a counter-shaft connected with said driving-shaft through the medium of a sprocket-chain and sprocket-wheels mounted on said shaft, whereof the sprocket-wheel on the driving-shaft is splined thereto so as to be capable of sliding movement thereon; and a bearing for the driving-shaft situated so that when the sprocket-wheel on said shaft abuts against it, said sprocket-wheel will be in alinement with the sprocket-wheel on the counter-shaft, substantially as described.

15. In a molding-machine, the combination with the embossing-roll arbor constructed with jointed and independently-adjustable sections, of a rotary shaft having a couple of pairs of clutch members, each pair of which is arranged for independent engagement, and is connected with means for adjusting one of the arbor-sections, as set forth.

16. In a molding-machine, the combination with the embossing-roll arbor constructed with jointed and independently-adjustable sections, of screw-rods connected at their lower ends with bearings for said arbor-sections, and confined at their upper ends within rotary nuts; a rotary shaft provided with suitable driving means, and provided also with a couple of pairs of clutch members, whereof, in each pair, one member is gear-connected with one of said rotary nuts, and the other is arranged for independent engagement and disengagement with its coöperating member by a sliding movement on said shaft, whereby said arbor-sections can be adjusted separately or jointly, substantially as described.

17. In a molding-machine, the combination with the jointed and adjustable arbor, of a bearing arranged to fit upon the end of said arbor; and a swinging link having a pivotal and sliding connection with the frame of the machine, and adapted to form a support for said bearing, as set forth.

18. In a molding-machine, the combination with the arbors whereof one is jointed and adjustable with reference to the other, of a detachable bearing for the stationary arbor; a swinging link having a pivotal and sliding connection with the detachable bearing for the stationary arbor; and a bearing for the relatively-adjustable arbor, said bearing being pivotally connected with the swinging link, as set forth.

19. In a machine for making picture-moldings, the combination with the rotary embossing-roll, of a rotatory sponge supported above and in contact with said embossing-roll; a horizontally-sliding arm to which said sponge is attached; a vertically-adjustable rod providing a guideway for said sliding arm; and a water-tank having a connection for supplying water to the sponge, and also having supports constructed to provide guideways for said vertically-adjustable rod, substantially as described.

20. The combination of an adjustable feed-hopper having a feed-outlet; a feed device confined within the feed-hopper and arranged to feed the material out of the feed-outlet thereof; means for adjusting the feed-hopper independently in transverse directions; and means for operating the feed device independent of the position in adjustment of the feed-hopper, as set forth.

21. The combination of a swinging feed-hopper having a feed-outlet; and adjustable supporting means therefor provided with means for adjusting and holding the same in swinging adjustment, as set forth.

22. The combination of a swinging feed-hopper having a feed-outlet; and supporting means therefor adapted for adjusting the same independently in transverse directions, and provided with means for adjusting and holding the same in swinging adjustment, as set forth.

23. In a machine for making picture-moldings, the combination of a feed-hopper provided with a feed-outlet and arranged for swinging motion so as to permit of its outlet being raised or lowered relatively to the molding-strip; supporting means therefor adapted for adjusting the same independently longitudinally and laterally of the direction of travel of the molding-strip, and provided with means for adjusting and holding the same in swinging adjustment, as set forth.

24. In a picture-molding machine, the combination of a feed-hopper provided with a feed-outlet and arranged for swinging motion so as to permit of its outlet being raised or lowered relatively to the molding-strip; a feed device confined within the feed-hopper and adapted to feed the material out of the outlet thereof; hopper-supporting means adapted for adjusting the same independently longitudinally and laterally of the direction of travel of the molding-strip, and provided with means for adjusting and holding the same in swinging adjustment; and means for operating the feed device independently of the position in adjustment of the feed-hopper, and also independently of the position in adjustment of the supporting means, as set forth.

25. The combination of an adjustable feed-hopper having a feed-outlet; a feed device confined therein and arranged for feeding the material out of the outlet thereof; means for operating the feed device independent of the position in adjustment of the hopper; and means for starting and stopping the operating means at will, as set forth.

26. The combination of a swinging feed-hopper having a feed-outlet; a rotary feed device confined therein and arranged to feed the material out of the outlet thereof; and a rotary shaft providing an axis about which the hopper swings, and having with the feed device a power-transmitting connection adapted to permit the operation of the same independent of the position in adjustment of the feed-hopper, as set forth.

27. The combination of a swinging feed-hopper having a feed-outlet; a rotary feed device confined therein and arranged to feed the material out of the outlet thereof; a rotary shaft providing an axis about which the hopper swings, and having a gear connection with the feed-hopper; and clutch mechanism between the rotary shaft and the gear connection of the same with the feed device, as set forth.

28. The combination of a swinging feed-hopper having a feed-outlet; a rotary feed device confined within the hopper and adapted to feed the material out of the outlet thereof; a rotary shaft providing an axis about which the hopper swings; a rotary sleeve inclosing the rotary shaft and pivotally supporting the feed-hopper; clutch mechanism between the shaft and inclosing sleeve; and suitable gearing between the latter and the feed device, as set forth.

29. The combination with the feed-hopper of a couple of supporting-carriages therefor, one of said carriages being adjustable relatively to the frame of the machine, and the other being adjustable relatively to the first-mentioned one; and means for adjusting said carriages in their respective adjustments independently of one another, and also for holding them in such adjustments, as set forth.

30. The combination of a couple of supporting-carriages arranged for sliding adjustment in lateral or transverse directions; and a couple of rotary screw-rods for independently adjusting the same, as set forth.

31. A cylindrical feed-hopper comprising a couple of longitudinal halves detachably secured to one another, and constructed with laterally-extending tubular portions providing a tubular side feed-inlet; a rear end piece adapted to provide a bearing or support for a feed device; and a detachable nozzle screw-threaded to the forward end of the longitudinal halves, substantially as described.

WILLIAM ZOELLER.

Witnesses:
 A. F. DURAND,
 L. M. STONE.